United States Patent [19]

Fujibayashi et al.

[11] Patent Number: 5,034,109
[45] Date of Patent: Jul. 23, 1991

[54] RESIN COATING COMPOSITIONS AND ELECTROPHORETIC COATING METHOD USING SAME

[75] Inventors: Toshio Fujibayashi, Hadano; Osamu Isozaki, Yokohama; Haruo Nagaoka, Hiratsuka, all of Japan

[73] Assignee: Kansai Paint Company, Limited, Hyogo, Japan

[21] Appl. No.: 511,474

[22] Filed: Apr. 19, 1990

[30] Foreign Application Priority Data

Apr. 20, 1989 [JP] Japan .................................. 1-101476
Apr. 20, 1989 [JP] Japan .................................. 1-101477

[51] Int. Cl.$^5$ ...................... C09D 5/44; C08G 18/60; C07C 275/26
[52] U.S. Cl. .................................... 204/181.7; 528/68; 564/46
[58] Field of Search .................. 204/181.4, 181.7; 528/68; 564/46

[56] References Cited

U.S. PATENT DOCUMENTS

| | | | |
|---|---|---|---|
| 3,851,013 | 11/1974 | Perrey et al. | 564/46 |
| 3,971,709 | 7/1976 | Ohsawa et al. | 204/181.7 |
| 4,154,724 | 5/1979 | Schulze | 528/68 |
| 4,294,741 | 10/1981 | Bosso | 204/181.7 |
| 4,594,136 | 6/1986 | Schupp et al. | 204/181.7 |
| 4,865,704 | 9/1989 | Saatweber et al. | 204/181.7 |
| 4,909,915 | 3/1990 | Bederke et al. | 204/181.4 |

Primary Examiner—John F. Niebling
Assistant Examiner—Kishor Mayekar
Attorney, Agent, or Firm—Armstrong, Nikaido, Marmelstein, Kubovcik & Murray

[57] ABSTRACT

The present invention provides (i) a resin coating composition consisting essentially of a resin containing tertiary amino group and 3-alkoxyalkyl-3-acryloyl or methacryloyl-ureido group which is at least 0.6 in average number per molecule and which is represented by the formula

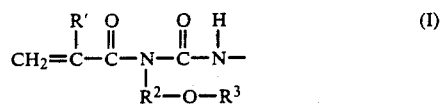

wherein $R^1$ is a hydrogen atom or a methyl group, $R^2$ is an alkylene group having 1 to 4 carbon atoms, and $R^3$ is an alkyl group having 1 to 10 carbon atoms, the resin having a number-average molecular weight of about 800 to about 50,000 and capable of becoming soluble or dispersible in water on neutralization; (ii) a resin coating composition consisting essentially of a mixture of a resin containing at least 1.4 primary or secondary hydroxyl groups on the average per molecule, the resin having a number-average molecular weight of about 600 to about 50,000 and a resin containing at least one 3-alkoxyalkyl-3-acryloyl or methacryloyl-ureido group of the formula (I) on the average per molecule, the resin having a number-average molecular weight of about 400 to about 30,000, at least one of the resins in the mixture containing tertiary amino group in an amount sufficient to make the mixture soluble or dispersible in water on neutralization; and (iii) an electrophoretic coating method comprising making at least one of the resin coating compositions (i) and (ii) into an aqueous form by neutralization and electrophoretically applying the aqueous composition to a substrate serving as a cathode.

12 Claims, No Drawings

RESIN COATING COMPOSITIONS AND ELECTROPHORETIC COATING METHOD USING SAME

The present invention relates to novel resin coating compositions and an electrophoretic coating method using the same.

Heretofore known are cationic electrophoretic coating compositions comprising a combination of a synthetic resin having hydroxyl group and amino group and a crosslinking agent, such as those comprising a combination of a hydroxyl-containing epoxy-polyamine resin and a blocked polyisocyanate as a crosslinking agent (Japanese Unexamined Patent Publication No.93024/1979), those comprising a combination of a synthetic resin having active hydrogen and a crosslinking agent capable of undergoing ester interchange (Japanese Unexamined Patent Publication No.80436/1980), etc.

However, the electrophoretic coating compositions containing a blocked polyisocyanate have the problem that the blocking agent dissociated from the blocked polyisocyanate in heat curing evaporates in the air, causing environmental pollution without contributing to the formation of coating. The electrophoretic coating compositions containing a crosslinking agent capable of undergoing ester interchange entail the problem that as the acid concentration increases due to the hydrolysis of crosslinking agent, the crosslinking curability deteriorates.

The electrophoretic coating compositions are also defective which comprise a combination of a synthetic resin having polymerizable unsaturated group and a blocked polyisocyanate having a monohydroxyalkyl acrylate or methacrylate or like alcohol containing $\alpha,\beta$-ethylenically unsaturated double bond as a blocking agent (Japanese Unexamined Patent Publication No.122564/1984). Since the blocked polyisocyanate has ester bond, the acid concentration is likely to increase due to the hydrolysis of the ester bond and the polyisocyanate tends to assume a crystalline structure. Further the alcohol containing $\alpha,\beta$-ethylenically unsaturated double bond dissociated from the blocked polyisocyanate by heating remains in the coating and increases the hydroxyl concentration, resulting in the formation of a coating poor in the corrosion resistance and the like.

Generally known are a resin component for a self-curing electrophoretic coating composition which crosslinks on thermal polymerization of a resin containing $\alpha,\beta$-ethylenically unsaturated double bonds as functional groups (Japanese Unexamined Patent Publication No.84035/1978) and a resin component for an electrophoretic coating composition which crosslinks on reaction between a resin having active hydrogen and $\alpha,\beta$-ethylenically unsaturated double bond formed by baking a Michael addition product of an amino compound and $\alpha,\beta$-ethylenically unsaturated double bond-containing compound (Japanese Unexamined Patent Publication No.31889/1980), etc. However, the former resin component is disadvantageous in that a high-temperature baking (at about 180° C. or above) is needed for the polymerization reaction between $\alpha,\beta$-ethylenically unsaturated double bonds and that the oxygen inhibits the curing of composition in the air, resulting in tendency to cure the coating surface incompletely. On the other hand, the latter resin component gives a cured coating prone to discoloration and fails to assure sanitation because of the evaporation of amino compound from the coating during curing, hence undesirable.

It is an object of the present invention to provide a novel resin coating composition free of the foregoing problems and an electrophoretic coating method using the resin coating composition.

It is another object of the invention to provide a novel resin coating composition which would lessen the degree of the reduction in amount induced by heating (loss on heating), hence substantially free of environmental problem and which is excellent in low-temperature curability and capable of giving a coating improved in resistance to corrosion, and an electrophoretic coating method using the coating composition.

These and other objects of the present invention will become more apparent from the following description.

According to the present invention, there are provided:

(i) a resin coating composition consisting essentially of a resin containing tertiary amino group and 3-alkoxyalkyl-3-acryloyl or methacryloyl-ureido group which is at least 0.6 in average number per molecule and which is represented by the formula

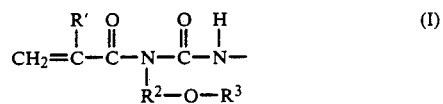

wherein $R^1$ is a hydrogen atom or a methyl group, $R^2$ is an alkylene group having 1 to 4 carbon atoms, and $R^3$ is an alkyl group having 1 to 10 carbon atoms, the resin having a number average molecular weight of about 800 to about 50,000 and capable of becoming soluble or dispersible in water on neutralization (hereinafter referred to as "resin (A)"); and (ii) a resin coating composition consisting essentially of a mixture of a resin containing at least 1.4 primary or secondary hydroxyl groups on the average per molecule, the resin having a number-average molecular weight of about 600 to about 50,000 (hereinafter referred to as "resin (B)") and a resin containing at least one 3-alkoxyalkyl-3-acryloyl or methacryloyl-ureido group of the formula (I) on the average per molecule and having a number-average molecular weight of about 400 to about 30,000 (hereinafter referred to as "resin (C)"), at least one of the resins in the mixture containing tertiary amino group in an amount sufficient to make the mixture soluble or dispersible in water on neutralization.

According to the present invention, there is also provided a cationic electrophoretic coating method comprising the steps of making at least one of the resin coating compositions into an aqueous form by neutralization and electrophoretically applying the aqueous composition to a substrate serving as a cathode.

We have conducted research and successfully developed a resin coating composition consisting essentially of a resin component containing tertiary amino group and a specific amount of the 3-alkoxyalkyl-3-acryloyl or methacryloyl-ureido group resulting from a reaction between an alkoxyalkyl-containing acrylamide or methacrylamide compound and isocyanato group. Our finding was that the resin coating composition thus developed is free of the foregoing prior art problems, insusceptible to loss on heating and excellent in low-temperature curability, and gives coatings improved in corrosion resistance, when applied for usual coating or for cationic electrodeposition in an aqueous form achieved by neutralization.

The present invention has been accomplished on the basis of this novel finding.

The ureido group of the formula (I) in the invention (hereinafter referred to as "ureido group (I)") is a polyfunctional group having both $\alpha,\beta$-ethylenically unsaturated double bond able to be adducted to hydroxyl group and alkoxyalkyl group able to undergo ether interchange with hydroxyl group or self-condensation.

The resin (A) in the coating composition of the invention will be described below in detail.

The resin (A) is a self-crosslinkable one containing tertiary amino group and at least 0.6 ureido group (I) on the average per molecule. The resin (A) has the ureido group (I) and when required primary or secondary hydroxyl group in a combined number of preferably at least two on the average per molecule in view of curability.

The resin (A) can be obtained as by introducing an adduct into a resin containing tertiary amino group and hydroxyl group, the adduct (hereinafter referred to as "adduct (a)") being one formed by reacting a N-alkoxyalkyl acrylamide or methacrylamide represented by the formula (II)

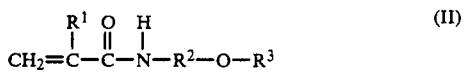

$$CH_2=\overset{R^1}{\underset{|}{C}}-\overset{O}{\underset{\|}{C}}-\overset{H}{\underset{|}{N}}-R^2-O-R^3 \qquad (II)$$

wherein $R^1$, $R^2$ and $R^3$ are as defined above (hereinafter referred to as "compound II") with certain of isocyanato groups in the polyisocyanate. The introduction of the adduct (a) can be done by the urethanating reaction between the isocyanato group remaining in the adduct (a) and the hydroxyl group in the resin.

Examples of polyisocyanate compounds for use in preparation of the adduct (a) can be any of aliphatic, alicyclic and aromatic polyisocyanate compounds. Typical examples of the polyisocyanate compound are 2,4- or 2,6-tolylene diisocyanate, m-xylylene diisocyanate, methylcyclohexane-2,4-diisocyanate, 1,3-isocyanato methylcyclohexane, isophorone diisocyanate, diphenylmethane-4,4'-diisocyanate, trimethylhexamethylene diisocyanate, hexamethylene diisocyanate, tetramethylene diisocyanate, polymethylene polyphenyl polyisocyanate and the like, polyisocyanate compounds prepared by reacting an excess amount of such polyisocyanate with ethylene glycol, propylene glycol, trimethylol propane, hexanetriol, castor oil or like low-molecular weight active hydrogen-containing compound, etc. These polyisocyanate compounds are usable singly or at least two of them can be used in mixture.

The group $R^2$ in the compound (II) for use in preparation of the adduct (a) can be straight or branched chain insofar as it is alkylene group having 1 to 4 carbon atoms. Examples of such groups are methylene, ethylene, n-propylene, n-butylene, etc. The group $R^3$ is an alkyl group having 1 to 10, preferably 1 to 4, carbon atoms and can be straight or branched chain. Examples of such groups are methyl, ethyl, n-propyl, isopropyl, n-butyl, isobutyl, t-butyl, n-hexyl, 2-ethylhexyl, n-decyl, etc.

Representative examples of the compound (II) are N-n-butoxymethyl acrylamide or methacrylamide, N-isobutoxymethyl acrylamide or methacrylamide, N-methoxymethyl acrylamide or methacrylamide, etc.

These compounds are usable singly or at least two of them can be used in mixture.

The reaction between the polyisocyanate and the compound (II) is performed to react the isocyanato group with the NH group of the compound (II) and is conducted usually in an inert organic solvent in the presence of a catalyst for addition of the isocyanato and a radical polymerization inhibitor at a temperature of about 80° C. to about 150° C., preferably about 100° C. to about 120° C. for about 5 to about 30 hours.

A suitable mixing ratio of the polyisocyanate and the compound (II) for use in this reaction is determined such that the number of the isocyanate group remaining in the polyisocyanate after the reaction is up to one, preferably 0.5 to 1, per molecule in terms of stoichiometric amount.

The inert organic solvent usable in the reaction is inert to an isocyanato group and is one capable of dissolving or dispersing the polyisocyanate, the compound (II) and the reaction product of the polyisocyanate and the compound (II). Typical examples of such solvents are xylene, toluene and like aromatic hydrocarbons, methyl ethyl ketone, methyl isobutyl ketone, cyclohexanone, acetone and like ketones, ethylene glycol dimethyl ether, diethylene glycol dimethyl ether and like hydroxyl-free ethers, dioxane and like cyclic ethers, etc.

Examples of the catalyst for addition of isocyanato which can be used in the reaction are organometallic compounds such as lead octylate, lead acetate and like organolead compounds, zinc naphthenate and like oranozinc compounds, manganese acetate and like organomanganese compounds, dibutyltin dilaurate, dibutyltin diacetate and like organotin compounds, and sodium oxalate and like organosodium compounds, triethylamine, tri-n-butylamine, pyridine and like tertiary amines, cetyltrimethylammonium bromide, tetraethylammonium bromide and like quaternary ammonium organic acid salts, sodium hydroxide, potassium hydroxide and like alkali metal compounds, etc.

The amount of the catalyst for addition of isocyanato exceeds the amount required in the common reaction between hydroxyl group and isocyanato group. For example, the amount of dibutyltin dilaurate used as such catalyst is usually about 500 ppm in the reaction between hydroxyl group and isocyanato group, but about 5,000 to about 50,000 ppm in the reaction between the polyisocyanate and the compound (II), namely 10 to 100 times the amount thereof used in the common reaction between hydroxyl group and isocyanato group.

Radical polymerization inhibitors useful in the reaction are those capable of inhibiting thermal radical polymerization reaction, including parabenzoquinone, methoxyphenol, 2,6- or 2,5-dichloro-p-benzoquinone, diphenylpicrylhydrazyl, hydroquinone, tert-butylhydroquinone, methylhydroquinone, phenothiazine, N,N'-di-2-naphthyl-P-phenylenediamine, etc. A preferred amount of the radical polymerization inhibitor is in the range of about 1,000 to about 50,000 ppm.

The adduct (a) resulting from the reaction between the polyisocyanate and the compound (II) is subjected to urethanating reaction with a resin containing tertiary amino group and hydroxyl group. The resin to be reacted with the adduct (a) is selectable without specific limitation from known resins containing at least 2, preferably 2 to 200, hydroxyl groups on the average per molecule and having a number-average molecular weight of about 600 to about 50,000.

Examples of useful resins containing tertiary amino group and the above-specified number of hydroxyl groups are acrylpolyol-type, polyesterpolyol-type, polyetherpolyol-type, alkyd-type, caprolactonepolyol-type, epoxy-type and urethanepolyol-type resins. The resins containing tertiary amino group and hydroxyl group may be products modified with a modifier, such as polycaprolactonediol which is a reaction product of ethylene glycol or like diol and ε-caprolactone, polypropylene glycol, polytetramethylene glycol, dimer acid polyamide, carboxyl-terminated acrylonitrilebutadiene copolymer, adduct of acrylic or methacrylic acid and ε-caprolactone, etc.

The urethanating reaction between the adduct (a) and the resin containing tertiary amino group and hydroxyl group is carried out usually in an inert organic solvent in the presence of a catalyst for addition of isocyanato and a radical polymerization inhibitor with or without heating at a temperature of 0° C. to about 150° C. for about 1 to about 30 hours.

The mixing ratio of the adduct (a) and the resin containing tertiary amino group and hydroxyl group for use in the reaction is not critical insofar as it is in the range which permits the reaction between the resin and all isocyanato groups present in the adduct (a). The mixing ratio by weight of the former to the latter in terms of solid content is between about 0.5 : 99.5 and about 90 : 10, preferably about 10 : 90 and about 70 : 30.

Inert organic solvents useful for the urethanating reaction are those inert to isocyanato group and capable of dissolving or dispersing the adduct (a), the above-mentioned resin and the reaction product of the adduct and the resin. Typical solvents include those usable for the reaction of the polyisocyanate and the compound (II).

The catalyst for addition of isocyanato and the radical polymerization inhibitor useful for the reaction between the polyisocyanate and the compound (II) are also usable for the urethanating reaction. The amount of the catalyst used for addition of isocyanato is preferably about 1/10 to about 1/100 the amount of the catalyst used for the reaction of the polyisocyanate with the compound (II).

The tertiary amino group present in the resin (A) prepared in the above manner is used in such amount as to make the resin (A) soluble or dispersible in water on neutralization. The amount is about 0.4 to about 2.1 moles, preferably about 0.5 to about 1.7 moles, per kilogram of the resin. The resin (A) has at least 0.6, preferably about 1 to about 60, ureido groups (I) on the average per molecule, and contains primary or secondary hydroxyl group incorporated when required and ureido group (I) preferably in a total number of at least two, preferably about 2 to about 120, on the average per molecule. In view of curability the numerical ratio of the ureido group (I) to the primary or secondary hydroxyl group is desirably between 1 : 0 and 1 : 3, more preferably 1 : 0.3 and 1 : 2. When less than 0.6 ureido group (I) is present on the average in the molecule, a poor self-crosslinkability results.

The resin (A) is one having a number-average molecular weight of about 800 to about 50,000, preferably about 1,000 to about 30,000. A resin with a number-average molecular weight of less than 800 is difficult to synthesize, whereas a resin with a number-average molecular weight of over 50,000 fails to impart a good smoothness to the coating surface.

The resin (B) in the coating composition of the invention will be described below in detail.

The resin (B) contains at least about 1.4, preferably about 1.4 to about 430, primary or secondary hydroxyl groups on the average per molecule and has a number-average molecular weight of about 600 to about 50,000. The resin (B) which is used in combination with the resin (C) optionally contains the ureido group (I), and has the primary or secondary hydroxyl group and the ureido group (I) preferably in a total number of about 2 to about 200 on the average per molecule in view of curability.

The resin (B) free of the ureido group (I) desirably contains about 2, more preferably about 2 to about 200, hydroxyl groups. Such hydroxyl-containing resins include known resins, e.g. acrylpolyol-type, polyesterpolyol-type, polyetherpolyol-type, alkyd-type, caprolactonepolyol-type, epoxy-type and urethane polyol-type, etc. These hydroxyl-containing resins may be those modified with a modifier such as polycaprolactone diol which is a reaction product of ethylene glycol or like diol and ε-caprolactone, polypropylene glycol, polytetramethylene glycol, dimer acid polyamide, carboxyl-terminated acrylonitrile-butadiene copolymer, adduct of acrylic or methacrylic acid and ε-caprolactone, etc.

For introduction of the ureido group (I) into the resin (B), for example the resin (B) containing at least 2 hydroxyl groups is reacted with the adduct (a) under the same conditions as those for the reaction between the adduct (a) and the tertiary amino- and hydroxyl-containing resin for the preparation of the resin (A).

The resin (B) has a number-average molecular weight of about 600 to about 50,000, preferably about 1,000 to about 30,000. A number-average molecular weight of less than 600 reduces the corrosion resistance, whereas a number-average molecular weight of more than 50,000 impairs the smoothness of coating surface.

The resin (C) to be used conjointly with the resin (B) in the coating composition of the invention will be described below in detail.

The resin (C) contains at least one, preferably about 2 to about 40, ureido groups (I) on the average per molecule, and has a number-average molecular weight of about 400 to about 30,000. Examples of such resins are an equivalent adduct (hereinafter referred to as "adduct (b)") of the compound (II) and a mono- or poly-isocyanate, a reaction product of the adduct (a) and a hydroxyl-containing compound or resin, etc.

Examples of useful mono- or poly-isocyanate compounds are benzene, 1-(1-isocyanato-1-methylethyl)-4-(1-methylethenyl), the above-exemplified polyisocyanates, and the compounds obtained by partially blocking the polyisocyanate with an alcohol or like blocking agent and having at least one isocyanate group in the molecule. The hydroxyl-containing compound or resin to be used conjointly with the adduct (a) for producing the reaction product include those having about 1 to about 80, preferably about 2 to about 40, hydroxyl groups on the average per molecule such as ethylene glycol, propylene glycol, trimethylolpropane, hexanetriol, castor oil and resins having at least 2 hydroxyl groups shown above as the resin (B).

The adduct of the compound (II) and mono- or poly-isocyanate can be prepared under the same reaction conditions as those for the preparation of the adduct (a). The reaction product of the adduct (a) and the hydroxyl-containing compound or resin can be prepared under the same reaction conditions as those in the reaction between the adduct (a) and the tertiary amino-and hydroxyl-containing resin for preparation of the resin (A).

At least one of the resins (B) and (C) essentially contains tertiary amino group capable of making the resin mixture soluble or dispersible in water on neutralization in view of curability and degree of aqueousness.

Among the resins (A), (B) and (C) thus obtained, the resin (A) is singly usable because it is self-curable, whereas the resin (B) having little or no self-curability is essentially used conjointly with the resin (C). The mixing ratio of the resins (B) and (C) is suitably selected, desirably over such range that the ratio of the total number of ureido group (I) to the total number of primary or secondary hydroxyl groups, all in the resins (B) and (C) is between about 1 : 0.02 and about 1 : 3, more preferably about 1 : 0.3 and about 1 : 2 in view of curability. The mixing weight ratio of the resin (B) to the resin (C) is between about 95 : 5 and about 30 : 70, preferably about 90 : 10 and about 60 : 40 in terms of solid content. In the coating composition of the invention consisting essentially of a mixture of resins (B) and (C), at least one of the resins in the mixture contains tertiary amino group in an amount sufficient to make the resin mixture soluble or dispersible in water by neutralization. In this case, the amount of the tertiary amino group is about 0.4 to about 2.1 moles, preferably about 0.5 to about 1.7 moles, per kilogram of the mixed resin solids.

The coating composition of the invention consisting essentially of the resin (A) or a mixture of the resins (B) and (C) thus obtained may be an organic solvent-based or an aqueous one. The coating composition is transformed into an aqueous form by neutralizing the essential resin component, followed by suitable dilution with water. The coating composition of the invention can be used both for usual coating and for electrophoretic coating. The coating composition for electrophoretic coating is essentially provided in an aqueous form.

When required, the coating composition of the invention may contain a resin component such as crosslinking agents, resins for modification, resins for pigment dispersion and the like; curing catalysts; pigments such as coloring pigments, extender pigments, corrosion inhibiting pigments and the like; dyes; additives for coating compositions such as pigment dispersants, leveling agents, defoaming agents, antisagging agents and the like; solvents; etc.

Examples of the neutralizing agent usable for neutralization of the tertiary amino group in the resin (A) or the mixture of the resins (B) and (C) are formic acid, acetic acid, propionic acid, lactic acid and like organic acids, hydrochloric acid, sulfuric acid, phosphoric acid and like inorganic acids. In use of such acids, the neutralization equivalent is about 0.2 to about 1.2, preferably about 0.3 to about 1.0.

Examples of the resin component to be optionally incorporated into the composition are blocked polyisocyanate resin, melamine resin and like crosslinking agents, acrylic resin, polyester resin, epoxy resin and like resins for modification or pigment dispersion, etc. These resins are used in an amount of less than 50% by weight based on the total amount of resins.

Preferred curing catalysts are basic compounds such as metal hydroxides, organic acid salts of metals, quaternary ammonium bases, quaternary phosphonium bases, tertiary sulfonium bases, organic acid salts of these onium bases and alkali metal alkoxides. Useful metal hydroxides include sodium hydroxide, potassium hydroxide, lithium hydroxide and like alkali metal hydroxides, calcium hydroxide, magnesium hydroxide, barium hydroxide and like alkaline earth metal hydroxides. Other examples are nickel hydroxide, copper hydroxide, molybdenum hydroxide, lead hydroxide, iron hydroxide, chromium hydroxide, manganese hydroxide, tin hydroxide, cobalt hydroxide and like metal hydroxides.

Examples of the quaternary ammonium bases, quaternary phosphonium bases and tertiary sulfonium bases useful in the invention include the bases represented by the following formulas

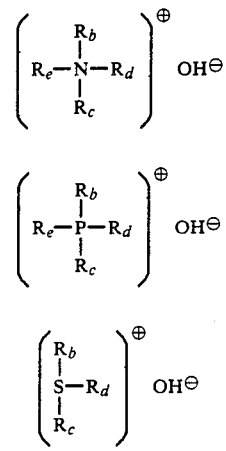

wherein $R_b$, $R_c$, $R_d$ and $R_e$ are the same or different and each preferably represent a hydrogen atom or an organic group having 1 to 14 carbon atoms, at least one of $R_b$, $R_c$, $R_d$ and $R_e$ is preferably an organic group having 1 to 14 carbon atoms, and $R_b$ and $R_c$, or $R_b$, $R_c$ and $R_d$ when taken together with nitrogen atom, phosphorus atom or sulfur atom to which they are attached may form a heterocyclic ring. The organic groups having 1 to 14 carbon atoms preferably usable as $R_b$, $R_c$, $R_d$ or $R_e$ are not specifically limited insofar as they are unprone to inhibit the ionization of ammonium bases, phosphonium bases or sulfonium bases. Usable as such organic groups are, for example, hydrocarbon groups of 1 to 14 carbon atoms which may contain oxygen atom or like hetero-atom as hydroxyl, alkoxy or like group.

Examples of such hydrocabon groups are alkyl, cycloalkyl, cycloalkylalkyl, aryl, arakyl and like aliphatic, alicyclic and aromatic hydrocarbon groups, etc. Useful alkyl groups may be straight or branched chain among which desirable alkyl groups are those having 1 to 8 carbon atoms, preferably lower groups, such as methyl, ethyl, n- or iso-propyl n-, iso-, sec- or tert-butyl, pentyl, heptyl and octyl, etc. Preferred cycloalkyl or cycloalkylalkyl groups include those having 5 to 8 carbon atoms. More specific examples of such groups are cyclopentyl, cyclohexyl, cyclohexylmethyl, cyclohexylethyl, etc. Useful aryl groups include phenyl, toluyl, xylyl, etc. Preferred aralkyl groups include benzyl.

Preferable as hydrocarbon groups containing heteroatom such as oxygen atom are hydroxylalkyl, particularly hydroxy lower alkyl, such as hydroxymethyl, hydroxyethy, hydroxybutyl, hydroxy pentyl, hydroxyheptyl, hydroxyoctyl; alkoxyalkyl, particularly lower alkoxy lower alkyl, such as methoxymethyl, ethoxymethyl, ethoxyethyl, n-propoxyethyl, iso-propoxymethyl, n-butoxymethyl, isobutoxyethyl, tert-butoxyethyl, etc.

Given below are examples of cationic ions present as the heterocyclic ring formed by $R_b$ and $R_c$, or $R_b$, $R_c$ and $R_d$ together with nitrogen atom, phosphorus atom or sulfur atom to which they are attached.

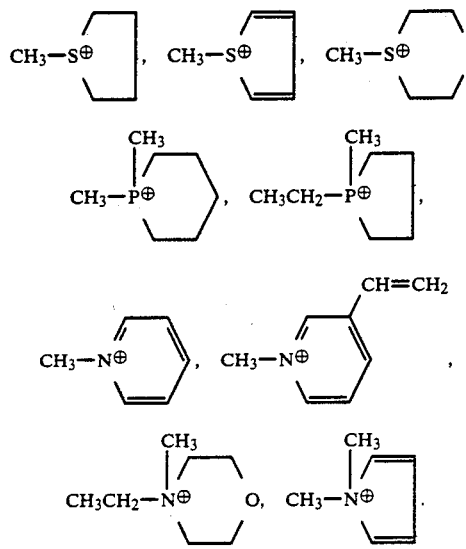

The metal hydroxides and organic acid salts of onium bases useful as curing catalysts in the invention can be obtained by neutralization of the hydroxide or the onium base with octenoic acid, naphthenic acid, abietic acid, acetic acid, formic acid, propionic acid, trimethylacetic acid, acrylic acid, methacrylic acid, lactic acid, hydroxyacetic acid, crotonic acid, chloroacetic acid, monomethyl maleate, monoethyl fumarate, monomethyl itaconate or like organic acid.

Representative of useful alkali metal alkoxides are sodium ethoxide, sodium methoxide, potassium methoxide, potassium ethoxide and the like.

Among the examples given above, it is preferred to use metal hydroxides and organic acid salts of metals which lead to formation of coatings excellent in low-temperature curability and high-temperature water resistance. More preferred are organic acid salts of metals selected from lead, manganese and cobalt.

A suitable amount of the curing catalyst to be used is about 20 parts by weight or less, preferably about 0.1 to about 10 parts by weight, per 100 parts by weight of the resin solids.

The pigments, dyes, additives for coating compositions and solvents which may be incorporated into the coating compositions of the invention are not specifically limited insofar as they are those commonly used in the coating art. The pigment useful for an electrophoretic coating composition is incorporated in an amount of preferably 50% by weight or less based on the total solid content in view of bath stability. Typical solvents are isopropanol, butanol, 2-ethylhexyl alcohol, benzyl alcohol and like alcohols, octoxyethanol and like monoalkyl ethers of ethylene glycol, monoalkyl ethers of propylene glycol, monoalkyl ethers of diethylene glycol, monoalkyl ethers of dipropylene glycol, dialkyl ethers of ethylene glycol, dialkyl ethers of diethylene glycol or dipropylene glycol, aromatic, aliphatic and alicyclic hydrocarbons, ketones, dioxane and like cyclic ethers, etc.

For ordinary coating, the coating composition of the invention optionally containing a curing catalyst or the like is applied in a usual manner as it is or as suitably diluted with a solvent or with water after transformation into an aqueous form. The coating composition thus applied can be cured by heating at a temperature of about 50° C. or higher, preferably about 80° C. to about 200° C., more preferably about 120° C. to about 170° C., preferably for about 5 minutes or more, more preferably about 10 to about 60 minutes. The coating composition of the invention is excellent in low-temperature curability and capable of mitigating the loss on heating, and capable of giving a cured coating with high corrosion resistance.

The coating composition of the invention for electrophoretic coating is suitably diluted with water after transformation into an aqueous form to obtain an electrophoretic coating bath having a solid concentration of about 1% to about 30% by weight, preferably about 13% to about 25% by weight. The diluted aqueous coating composition is subjected to cationic electrodeposition employing a substrate to be coated as a cathode. The substrate is essentially electroconductive. A suitable electrodeposition is performed as by applying a voltage of about 10 to about 500 V, preferably about 50 to about 350 V across the substrate and the counter electrode for about 30 seconds to about 10 minutes according to a constant voltage process. Other processes can be employed which include a slow start process in which the voltage is elevated from zero to a constant level in the electrodeposition continuing for a specific period, a constant current process in which a constant current is applied instead of a constant voltage, modes comprising a combination of these processes, etc. Coating films of varying thicknesses, e.g. thin films of about 5 μm thickness and thick films of about 50 to about 80 μm thickness can be formed by altering the electrophoretic coating conditions.

After completion of electrodeposition, the coated substrate is withdrawn from the bath, washed with water and baked. The applied coating is excellent in low-temperature curability, and can be cured by heating at a temperature of about 60° C. or higher, preferably about 80° C. to about 200° C., more preferably about 120° C. to about 170° C., preferably for about 5 minutes or more, more preferably about 10 to about 60 minutes, and is not prone to cause loss on heating. The cured coating has a high corrosion resistance.

The mechanism for curing the coating of the coating composition according to the invention is not clear but is presumably as follows. According to the variations in infrared absorption spectrum due to heating, the disappearance of unsaturated group and the change of ether bond are recognized and the isocyanate group is not formed. From these factors, low-temperature curing, insusceptibility to loss on heating, etc., it is presumed there occur the addition of the hydroxyl group to the polymerizable unsaturated group, ether interchange between the alkoxy group of the alkoxyalkyl group and the hydroxyl group and alcohol-removing condensation reaction between alkoxyalkyl groups.

The resin coating compositions of the invention essentially comprise a resin containing as a reactive group 3-alkoxyalkyl-3-acryloyl or methacryloyl-ureido group having two functional groups, i.e. $\alpha,\beta$-ethylenically unsaturated double bond and alkoxyalkyl group bonded to the amido. The ureido bonding of the ureido group is stable and is not prone to dissociation which would cause the formation of free isocyanate even by heating for curing, resulting in lessening the loss on heating. Thus the coating compositions of the invention are free of environmental problem and give a coating improved in corrosion resistance and the like due to the increase of adhesion to the substrate induced by the ureido bonding, and also enhanced in low-temperature curability presumably because of the mechanism of the reaction.

The present invention will be described below in greater detail with reference to the following Preparation Examples, Examples and Comparison Examples in which the parts and percentages are all by weight unless otherwise specified.

PREPARATION OF TERTIARY AMINO- AND HYDROXYL-CONTAINING RESINS

Preparation Example 1

A flask equipped with a stirrer, a thermometer, a nitrogen inlet tube and a reflux condenser was charged with 760 parts of bisphenol A diglycidyl ether (epoxy equivalent of about 190 and molecular weight of about 380), 228 parts of bisphenol A and 0.35 part of dimethylbenzyl amine. In a nitrogen atmosphere, the mixture was reacted at 120° C. until the epoxy equivalent reached 490. To the reaction mixture were added 303 parts of methyl isobutyl ketone, 168 parts of diethanolamine and 57.6 parts of N,N,N'-trihydroxy-1,2-diaminoethane and the mixture was reacted at 80° C. for 8 hours, giving a resin solution (1). The obtained resin had 4.1 primary hydroxyl groups and 4.0 secondary hydroxyl groups, on the average per molecule.

Preparation Example 2

A flask equipped with a stirrer, a thermometer, a nitrogen inlet tube and a reflux condenser was charged with 470 parts of butyl glycidyl ether-modified bisphenol A diglycidyl ether (trade name "XB-4122", epoxy equivalent of about 390, product of Ciba-Geigy Corp.), 270 parts of bisphenol A and 0.3 part of dimethylbenzyl amine. In a nitrogen atmosphere, the obtained mixture was reacted at 160° C. until the epoxy groups exhausted. To the reaction mixture were added 603 parts of bisphenol A diglycidyl ether (epoxy equivalent of about 190 and molecular weight of about 380) and 0.2 part of dimethylbenzylamine. The resulting mixture was reacted at 130° C. until the epoxy equivalent became 650 or lower. A 329 part quantity of methyl isobutyl ketone, 168 parts of diethanolamine and 57.6 parts of N,N,N'-trihydroxy-1,2-diaminoethane were added thereto and the obtained mixture was reacted at 80° C. for 8 hours giving a resin solution (2).

Preparation Example 3

A flask equipped with a stirrer, a thermometer, a nitrogen inlet tube and a reflux condenser was charged with 760 parts of bisphenol A diglycidyl ether (epoxy equivalent of about 190 and molecular weight of about 380), 114 parts of bisphenol A and 0.3 part of dimethylbenzylamine. In a nitrogen atmosphere, the obtained mixture was reacted at 130° C. until the epoxy equivalent reached 290. A 680 part quantity of ε-caprolactone and 0.2 part of tetrabutoxy titanate were added. The resulting mixture was reacted at 170° C. while conducting sampling with time. The amount of the unreacted ε-caprolactone was traced by checking infrared absorption spectrum. When a 98% or more amount of ε-caprolactone was reacted, 114 parts of bisphenol A and 0.04 part of dimethylbenzylamine were added and the mixture was reacted at 150° C. until the epoxy equivalent reached 830. After the termination of the reaction, 473 parts of methyl isobutyl ketone, 168 parts of diethanolamine and 57.6 parts of N,N,N'-trihydroxy-1,2-diaminoethane were added. The resulting mixture was reacted at 80° C. for 8 hours, giving a resin solution (3).

Preparation Example 4

A flask equipped with a stirrer, a thermometer, a nitrogen inlet tube and a reflux condenser was charged with 500 parts of diethylene glycol dimethyl ether. There were mixed 300 parts of 2-hydroxyethyl methacrylate, 157 parts of N,N-dimethylaminoethylmethacrylate, 300 parts of styrene, 243 parts of n-butylacrylate and 20 parts of benzoyl peroxide. In a nitrogen atmosphere, the obtained solution was placed dropwise into the flask at 110° C. over a period of 3 hours. The obtained mixture was aged at 110° C. for 4 hours, giving a resin solution (4).

PREPARATION OF ADDUCT (A)

Preparation Example 5

A flask equipped with a stirrer, a thermometer and a reflux condenser was charged with 250 parts of diphenylmethane diisocyanate, 4.9 parts of 2,6-dichloroparabenzoquinone and 4.9 parts of dibutyltin dilaulate. The obtained mixture was heated to 120° C. A 235.5 part quantity of N-n-butoxymethyl acrylamide was added dropwise thereto to undergo reaction while maintaining the temperature at 120° C. When the NCO value reached 43, 44.1 parts of methyl isobutyl ketone was added, giving a solution of an adduct (a-1).

Preparation Examples 6 to 11

Solutions of adducts (a-2) to (a-7) were prepared in the same manner as in Preparation Example 5 with the exception of using the ingredients as shown below in Table 1 in the listed amounts.

PREPARATION OF ADDUCT (B)

Preparation Example 12

A solution of an adduct (b-1) was obtained by conducting the same procedure as in Preparation Example 5 with the exception of using the ingredients as shown in Table 1 in the listed amounts. The adduct (b-1) had 2.0 ureido groups (I) per molecule.

Preparation Example 13

A flask equipped with a stirrer, a thermometer and a reflux condenser was charged with 666 parts of isophorone diisocyanate, 11.4 parts of parabenzoquinone and 11.4 parts of dibutyltin dilaulate. The obtained mixture was heated to 120° C., and 471 parts of N-n-butoxymethyl acrylamide was added dropwise to undergo reaction while maintaining the same temperature. When the NCO value reached 110, 134 parts of trimethylol propane was added. The resulting mixture was reacted at 120° C. When the NCO value became zero, 295 parts of methyl isobutyl ketone was added, giving a solution of an adduct (b-2). The adduct (b-2) had 3.0 ureido groups (I) on the average per molecule.

TABLE 1

| | Preparation Example | | | | | | | | |
|---|---|---|---|---|---|---|---|---|---|
| | 5 | 6 | 7 | 8 | 9 | 10 | 11 | 12 | 13 |
| Solution of adduct (part) | (a-1) | (a-2) | (a-3) | (a-4) | (a-5) | (a-6) | (a-7) | (b-1) | (b-2) |
| Diphenylmethane diisocyanate | 250 | | | | | | | 250 | |
| Tolylene diisocyanate | | 174 | | | | | | | |
| Isophorone diisocyanate | | | 222 | 222 | 222 | 222 | 222 | | 666 |
| 2,6-Dichloroparabenzoquinone | 4.9 | 3.3 | | | | | | | |
| Methoxyphenol | | | 4.6 | | | | | | |
| Parabenzoquinone | | | | 3.8 | 3.9 | 3.8 | 3.4 | 11.3 | 11.4 |
| Dibutyltin dilaulate | 4.9 | 3.3 | 4.6 | 3.8 | 3.9 | 3.8 | 3.4 | 11.3 | 11.4 |
| N-n-Butoxymethyl acrylamide | 235.5 | 157 | 235.5 | 157 | | | | | |
| N-n-Butoxymethyl methacrylamide | | | | | 169 | | | 314 | 471 |
| N-Isobutoxymethyl acrylamide | | | | | | 157 | | | |
| N-Methoxymethyl acrylamide | | | | | | | 115 | | |
| Trimethylol propane | | | | | | | | | 134 |
| Methyl isobutyl ketone | 44.1 | 30.2 | 41.6 | 34.5 | 35.9 | 34.5 | 30.6 | 40.1 | 295 |
| NCO value (in terms of solid resin) | 43 | 127 | 46 | 110 | 107 | 110 | 125 | 0 | 0 |

PREPARATION OF A RESIN SOLUTION (BC) FOR COMPARISON EXAMPLE

Preparation Example 14

A 500 part quantity of methyl placed into a flask equipped with a stirrer, a thermometer, a nitrogen inlet tube and a reflux condenser. In a nitrogen gas atmosphere, 1000 parts of N-n-butoxymethyl acrylamide and 20 parts of azobisdimethyl valeronitrile were mixed together and the resulting solution was added dropwise thereto to undergo reaction at 80° C. over a period of 3 hours. The reaction mixture was aged at 80° C. for 4 hours, giving a resin solution (BC-1).

PREPARATION OF SOLUTIONS OF ISOCYANATO-CONTAINING ADDUCT (AC) FOR COMPARISON EXAMPLE

Preparation Example 15

A 174 part quantity of tolylene diisocyanate was placed into a flask equipped with a stirrer, a thermometer and a reflux condenser and was heated to 70° C. Ninety parts of ethylene glycol monoethyl ether was added dropwise thereto to undergo reaction while keeping the same temperature. When the NCO value reached 159, 29.3 parts of methyl isobutyl ketone was added, giving a solution of an adduct (ac-1).

Preparation Example 16

A flask equipped with a stirrer, a thermometer and a reflux condenser was charged with 174 parts of tolylene diisocyanate and 0.15 part of parabenzoquinone and the obtained mixture was heated to 70° C. While maintaining the same temperature, 116 parts of 2-hydroxyethyl acrylate was added dropwise to undergo reaction. When the NCO value reached 145, 32.1 parts of methyl isobutyl ketone was added, giving a solution of an adduct (ac-2).

Preparation Example 17

A flask equipped with a stirrer, a thermometer and a reflux condenser was charged with 174 parts of tolylene diisocyanate, 2.6 parts of parabenzoquinone and 2.6 parts of dibutyltin dilaulate. The obtained mixture was heated to 120° C. While maintaining the temperature at 120° C., 85 parts of methacrylamide was added dropwise to undergo reaction. The reaction mixture crystallized on reaction, failing to proceed with reaction. The reaction mixture was unable to dissolve in tetrahydrofuran.

PREPARATION OF SOLUTION OF RESIN (A) CONTAINING UREIDO GROUP (I) AND SOLUTION OF RESIN (AC) FOR COMPARISON EXAMPLE

Preparation Example 18

A flask equipped with a stirrer, a thermometer and a reflux condenser was charged with 1517 parts of the resin solution (1) and 347 parts of methyl ethyl ketone, and the obtained mixture was heated to 70° C. A 1350 part quantity of the solution of adduct (a-1) was added dropwise thereto over a period of 90 minutes while maintaining the temperature at 70° C. The resulting mixture was reacted at 70° C. while effecting sampling with time. After confirming the exhaustion of the unreacted isocyanato groups by measurement with infrared absorption spectrum, 24 parts of ethylene glycol monobutyl ether was added, giving a solution of an ureido group (I)-containing resin (A-1). The resin thus obtained had 3.75 ureido groups (I) and 2.85 primary or secondary hydroxyl groups on the average per molecule, and 0.91 tertiary amino group per kilogram of the resin in terms of solid resin.

Preparation Examples 19 to 30

The same procedure as in Preparation Example 18 was repeated with the exception of using the ingredients as shown below in Table 2 in the listed amounts, giving solutions of ureido group (I)-containing resins (A-2) to (A-11), and solutions of resins (AC-1) and (AC-2) for Comparison Examples.

TABLE 2

| | Preparation Example | | | | | | |
|---|---|---|---|---|---|---|---|
| | 18 | 19 | 20 | 21 | 22 | 23 | 24 |
| Resin solution | (A-1) | (A-2) | (A-3) | (A-4) | (A-5) | (A-6) | (A-7) |
| Resin solution | | | | | | | |
| Kind | (1) | (1) | (1) | (1) | (1) | (1) | (1) |
| Amount (part) | 1517 | 1517 | 1517 | 1517 | 1517 | 1517 | 1517 |
| Methyl ethyl ketone | 347 | | | | | | |
| Methyl isobutyl ketone | | 265 | | | | | |

TABLE 2-continued

| | | | | | | | |
|---|---|---|---|---|---|---|---|
| Ethylene glycol dimethyl ether | | | 290 | 267 | 331 | 290 | 298 |
| Acetic Acid | | | | | | | |
| Solution of adduct | | | | | | | |
| Kind | (a-1) | (a-2) | (a-6) | (a-7) | (a-3) | (a-4) | (a-5) |
| Amount (part) | 1350 | 920 | 1053 | 936 | 1271 | 1053 | 1092 |
| Ethylene glycol monobutyl ether | 24 | | | | | | |
| Ethylene glycol monoethyl ether | | 20 | | | | | |
| Propylene glycol monomethyl ether | | | 22 | 21 | 24 | 22 | 22 |
| Characteristics of resin | | | | | | | |
| Number of ureido group (I) (per molecule) | 3.75 | 2.5 | 2.5 | 2.5 | 3.75 | 2.5 | 2.5 |
| Number of primary or secondary hydroxyl group (per molecule) | 2.85 | 1.6 | 1.6 | 1.6 | 2.85 | 1.6 | 1.6 |
| Tertiary amino group (mole/kg resin) | 0.91 | 1.08 | 1.02 | 1.07 | 0.93 | 1.02 | 1.00 |

| | Preparation Example | | | | | |
|---|---|---|---|---|---|---|
| | 25 | 26 | 27 | 28 | 29 | 30 |
| Resin solution | (A-8) | (A-9) | (A-10) | (A-11) | (AC-1) | (AC-2) |
| Resin solution | | | | | | |
| Kind | (1) | (2) | (3) | (4) | (1) | (1) |
| Amount (part) | 1517 | 1961 | 2367 | 1500 | 1517 | 1517 |
| Methyl ethyl ketone | 295 | | | | | |
| Methyl isobutyl ketone | | 373 | 397 | 81 | 229 | 238 |
| Acetic Acid | 52 | | | | | |
| Solution of adduct | | | | | | |
| Kind | (a-1) | (a-1) | (a-1) | (a-1) | (ac-1) | (ac-2) |
| Amount (part) | 1350 | 1350 | 1350 | 1350 | 733 | 806 |
| Ethylene glycol monobutyl ether | 24 | 28 | 31 | 22 | | |
| Ethylene glycol monoethyl ether | | | | | 19 | 21 |
| Characteristics of resin | | | | | | |
| Number of ureido group (I) (per molecule) | 3.75 | 3.75 | 3.75 | 3.75 | 0 | 0 |
| Number of primary or secondary hydroxyl group (per molecule) | 2.85 | 2.85 | 3.85 | 1.06 | 1.6 | 1.6 |
| Tertiary amino group (mole/kg resin) | 0.91 | 0.79 | 0.71 | 0.99 | 1.17 | 1.07 |
| Number of polymerizable double bond not shown in formula (I) (per molecule) | | | | | | 2.5 |

PREPARATION OF THE RESIN COATING COMPOSITIONS OF THE PRESENT INVENTION AND APPLICATION THEREOF BY A BAR COATER

Example 1

A 133 part quantity of the solution of the resin (A-1) obtained in Preparation Example 18, 40 parts of methyl isobutyl ketone, 70 parts of propylene glycol monoisopropyl ether and 1 part of cobalt acetate were homogeneously mixed, giving a clear coating composition (Table 3).

The obtained coating composition was applied by a bar coater to a cold-rolled steel panel treated with zinc phosphate to a dry film thickness of 20 ∞m and the coated panel was cured by baking under the predetermined conditions of at 140° C. for 30 minutes and at 160° C. for 30 minutes. Table 4 shows the properties of the coatings cured by baking.

Examples 2 to 11

Clear coating compositions were prepared and coated panels were obtained by baking in the same manner as in Example 1 with the exception of using the ingredients as shown below in Table 3 in the listed amounts. The properties of the coatings formed on the panels are shown below in Table 4.

Example 12

A flask equipped with a stirrer, a thermometer and a reflux condenser was charged with 1,517 parts of the resin solution (1) obtained in Preparation Example 1, 1,253 parts of the solution of adduct (b-1) obtained in Preparation Example 12 and 329 parts of ethylene glycol dimethyl ether. These ingredients were mixed at 70° C. for 60 minutes and then 23 parts of propylene glycol monomethyl ether was added thereto, giving a resin solution (M-1). The same procedure as in Example 1 was repeated with the exception of using the resin solution (M-1) obtained above and the ingredients as shown in Table 3 in the listed amounts, giving a clear coating composition and a baked coated panel.

Example 13

A flask equipped with a stirrer, a thermometer and a reflux condenser was charged with 1,517 parts of the resin solution (1) prepared in Preparation Example 1, 1,011 parts of the solution of adduct (b-2) obtained in Preparation Example 13 and 162 parts of ethylene glycol dimethyl ether. These ingredients were homogeneously mixed, giving a resin solution (M-2). The same procedure as in Example 1 was repeated with the exception of using the resin solution (M-2) obtained above and the ingredients as shown below in Table 3 in the listed amounts, giving a clear coating composition and a baked coated panel.

Table 4 shows the test results in Examples 12 and 13.

Comparison Examples 1, 2 and 4

The same procedure as in Example 1 was repeated with the exception of using the ingredients as shown below in Table 3 in the listed amounts, giving clear coating compositions and baked coated panels. Table 4 shows the properties of the cured coatings.

shown below in Table 3 in the listed amounts, giving a clear coating composition and a baked coated panel.
Table 4 shows the properties of the cured coatings.

TABLE 3

| | Example | | | | | | | | |
|---|---|---|---|---|---|---|---|---|---|
| | 1 | 2 | 3 | 4 | 5 | 6 | 7 | 8 | 9 |
| Resin solution | | | | | | | | | |
| Kind | (A-1) | (A-2) | (A-3) | (A-4) | (A-5) | (A-6) | (A-7) | (A-8) | (A-9) |
| Amount (part) | 133 | 133 | 133 | 133 | 133 | 133 | 133 | 133 | 133 |
| Methyl isobutyl ketone | 40 | 110 | | 20 | | 20 | 60 | | 40 |
| Propylene glycol mono-isopropyl ether | 70 | | 110 | 30 | 110 | 30 | 50 | 30 | 70 |
| Formic acid | | | | | 5 | | | | |
| Acetic acid | | | | | | 5 | | | |
| Catalyst | | | | | | | | | |
| Kind | Lead acetate | Lead acetate | Calcium acetate | Calcium acetate | Lead acetate | Lead acetate | Molybdenum hydroxide | Cobalt acetate | Lead acetate |
| Amount (part) | 2 | 2 | 1 | 1 | 2 | 2 | 1.5 | 2 | 1.5 |
| Deionized water | | | | 60 | | 60 | | 80 | |

| | Example | | | | Comparison Example | | | |
|---|---|---|---|---|---|---|---|---|
| | 10 | 11 | 12 | 13 | 1 | 2 | 3 | 4 |
| Resin solution | | | | | | | | |
| Kind | (A-10) | (A-11) | (M-1) | (M-2) | (AC-1) | (AC-2) | (MC-1) | (BC-1) |
| Amount (part) | 133 | 133 | 133 | 133 | 133 | 133 | 133 | 133 |
| Methyl isobutyl ketone | 40 | 40 | | 110 | 40 | 40 | 40 | 40 |
| Propylene glycol mono-isopropyl ether | 70 | 70 | 110 | | 70 | 70 | 70 | 100 |
| Catalyst | | | | | | | | |
| Kind | Lead acetate | Lead acetate | Cobalt acetate | Cobalt acetate | Lead acetate | Lead acetate | Lead acetate | Lead acetate |
| Amount (part) | 1.5 | 1.5 | 2 | 1 | 2 | 2 | 2 | 2 |

TABLE 4

| | Example | | | | | | | | |
|---|---|---|---|---|---|---|---|---|---|
| | 1 | 2 | 3 | 4 | 5 | 6 | 7 | 8 | 9 |
| Test results | | | | | | | | | |
| Gel fraction ratio (*1) (%) | | | | | | | | | |
| 140° C. | 88 | 85 | 89 | 90 | 87 | 90 | 80 | 87 | 91 |
| 160° C. | 97 | 95 | 97 | 96 | 94 | 95 | 97 | 95 | 98 |
| Loss on heating (*2) (%) | | | | | | | | | |
| 140° C. | 1.5 | 1.2 | 1.7 | 0.6 | 1.6 | 1.3 | 1.6 | 1.4 | 1.9 |
| 160° C. | 3.5 | 3.0 | 3.7 | 2.0 | 3.6 | 2.8 | 3.9 | 3.8 | 4.0 |
| Resistance to salt spary (*3) | | | | | | | | | |
| 140° C. | 1000 H | 1100 H | 1000 H | 1200 H | 1000 H | 900 H | 800 H | 1200 H | 900 H |
| 160° C. | 1500 H | 1300 H | 1400 H | 1300 H | 1500 H | 1200 H | 1100 H | 1500 H | 1200 H |

| | Example | | | | Comparison Example | | | |
|---|---|---|---|---|---|---|---|---|
| | 10 | 11 | 12 | 13 | 1 | 2 | 3 | 4 |
| Test results | | | | | | | | |
| Gel fraction ratio (*1) (%) | | | | | | | | |
| 140° C. | 90 | 83 | 92 | 90 | 55 | 90 | 77 | 75 |
| 160° C. | 96 | 94 | 98 | 98 | 94 | 95 | 90 | 93 |
| Loss on heating (*2) (%) | | | | | | | | |
| 140° C. | 2.0 | 2.5 | 1.4 | 1.9 | 2.5 | 4.5 | 1.3 | 2.2 |
| 160° C. | 4.2 | 4.5 | 3.6 | 5.0 | 13.5 | 9.5 | 3.0 | 8.6 |
| Resistance to salt spary (*3) | | | | | | | | |
| 140° C. | 900 H | 800 H | 1100 H | 1000 H | 100 H | 400 H | 200 H | 300 H |
| 160° C. | 1200 H | 1200 H | 1300 H | 1300 H | 900 H | 600 H | 700 H | 800 H |

Comparison Example 3

A flask equipped with a stirrer, a thermometer and a reflux condenser was charged with 1,517 parts of the resin solution (1) and 966 parts of the resin solution (BC-1) obtained in Preparation Example 14. These ingredients were mixed at 70° C. for 60 minutes, giving a resin solution (MC-1). The same procedure as in Example 1 was repeated with the exception of using the resin solution (MC-1) obtained above and the ingredients as The tests were conducted by the following methods with the results as listed in Table 4.

(*1) Gel fraction ratio

The coating peeled from the substrate was immersed in acetone maintained at about 57° C. (with refluxing) for 4 hours for extraction.

Gel fraction ratio (%) =

-continued $$\frac{\text{Weight of coating after immersion in acetone}}{\text{Weight of coating before immersion in acetone}} \times 100$$

(*2) Loss on heating

After application of the coating composition to the panel, the solvent was removed from the coating at 80° C. under reduced pressure before baking until the weight of the coating was reduced to a constant value. Thereafter the coating was baked at a predetermined temperature for 30 minutes. The loss on heating was calculated according to the following equation:

$$\text{Loss on heating (\%)} = \frac{\text{Weight of coating before baking}}{\text{Weight of coating after baking}} \times 100$$

(*3) Resistance to salt spray

The coating was cut crosswise to the substrate and tested for resistance to salt spray according to JIS Z2371. The time lapsed until the maximum width of blistering or creep on one side of the cut reached 3 mm was indicated.

PREPARATION OF THE RESIN COATING COMPOSITIONS OF THE INVENTION AND APPLICATION THEREOF BY A CATIONIC ELECTRODEPOSITION

Example 14

A 10 part quantity of the solution of resin (A-obtained in Preparation Example 17, 1.0 part of carbon black, 15 parts of talc, 3 parts of ethylene glycol monoethyl ether, 0.7 part of acetic acid and 17.3 parts of deionized water were mixed together. The mixture was dispersed for 48 hours by a pebble ball mill, giving a pigment paste containing particles having a particle size of 10 $\infty$m or less as measured by a fineness gauge.

To 123 parts of the solution of resin (A-1) were added 1 part of cobalt acetate and 1.4 parts of acetic acid and the resulting mixture was homogeneously stirred. A 507 part quantity of deionized water was gradually added with stirring, giving an aqueous clear solution. Forty-seven parts of the pigment paste obtained above was added to the aqueous clear solution and the mixture was homogeneously stirred to prepare a stable aqueous coating composition (Table 5).

The thus obtained aqueous coating composition was applied as an electrodeposition bath to a zinc phosphate-treated steel panel as a cathode by cation electrodeposition at 28° C. to a dry film thickness of 20 $\infty$m. The obtained panel was washed with water and cured by baking under the predetermined baking conditions of at 140° C. for 30 minutes and at 160° C. for 30 minutes. Table 6 below shows the properties of the cured coatings.

Examples 15 to 24

Coated panels were produced in the same manner as in Example 14 with the exception of using the ingredients as shown below in Table 5 in the listed amounts. Table 6 below shows the properties of the cured coatings.

Example 25

A flask equipped with a stirrer, a thermometer and a reflux condenser was charged with 1,517 parts of the resin solution (1) obtained in Preparation Example 1, 1,253 parts of the solution of adduct (b-1) prepared in Preparation Example 12 and 329 parts of ethylene glycol dimethyl ether. The ingredients were mixed at 70° C. for 60 minutes. The resulting mixture was homogeneously admixed with 23 parts of propylene glycol monomethyl ether, giving a resin solution (M-1).

The same procedure as in Example 14 was repeated with the exception of using the resin solution (M-1) obtained above and the ingredients as shown below in Table 5 in the listed amounts, giving a baked coated panel. Table 6 below shows the properties of the coatings.

Example 26

A flask equipped with a stirrer, a thermometer and a reflux condenser was charged with 1,517 parts of the resin solution (1) obtained in Preparation Example 1, 1,011 parts of the solution of adduct (b-2) obtained in Preparation Example 13 and 162 parts of ethylene glycol dimethyl ether and the ingredients were mixed at 70° C. for 60 minutes, giving a resin solution (M-2).

The same procedure as in Example 14 was repeated with the exception of using the resin solution (M-2) obtained above and the ingredients as shown below in Table 5 in the listed amounts, giving a baked coated panel. Table 6 shows the properties of the coatings.

Comparison Examples 5 and 6

Clear coating compositions were prepared and baked coated panels were obtained in the same manner as in Example 14 with the exception of using the ingredients as shown in Table 5 in the listed amounts. Table 6 shows the properties of the coatings.

Comparison Example 7

A flask equipped with a stirrer, a thermometer and a reflux condenser was charged with 1,517 parts of the resin solution (1) and 966 parts of the resin solution (BC-1) prepared in Preparation Example 14, and the ingredients were mixed at 70° C. for 60 minutes, giving a resin solution (MC-1). The same procedure as in Example 14 was repeated with the exception of using the resin solution (MC-1) obtained above and the ingredients as shown in Table 5 in the listed amounts, giving a baked coated panel. Table 6 shows the properties of the coatings.

TABLE 5

| | Example | | | | | | | |
|---|---|---|---|---|---|---|---|---|
| | 14 | 15 | 16 | 17 | 18 | 19 | 20 | 21 |
| Pigment paste | | | | | | | | |
| Resin solution | | | | | | | | |
| Kind | (A-1) | (A-2) | (A-3) | (A-4) | (A-5) | (A-6) | (A-7) | (A-8) |
| Amount (part) | 10 | 10 | 10 | 10 | 10 | 10 | 10 | 10 |
| Carbon black | 1 | 0.5 | 0.5 | 0.5 | 0.5 | 0.5 | 0.5 | 0.5 |
| Titanium whie (rutile) | | 10 | 10 | 10 | 10 | 10 | 10 | 10 |

TABLE 5-continued

|  |  |  |  |  |  |  |  |  |
|---|---|---|---|---|---|---|---|---|
| Clay |  | 15 | 15 | 15 | 12 | 15 | 15 | 15 |
| Talc | 15 |  |  |  |  |  |  |  |
| Basic lead silicate |  |  |  |  | 3 |  |  |  |
| Ethylene glycol monobutyl ether | 3 | 3 | 3 | 3 |  |  |  |  |
| Acid |  |  |  |  |  |  |  |  |
| Acetic acid | 0.7 | 0.7 |  |  | 0.7 | 0.7 | 0.7 | 0.4 |
| Formic acid |  |  |  | 0.6 |  |  |  |  |
| Lactic acid |  |  | 1.0 |  |  |  |  |  |
| Deionized water | 17.3 | 26.8 | 26.5 | 26.9 | 26.8 | 26.8 | 26.8 | 27.1 |
| Aqueous clear solution |  |  |  |  |  |  |  |  |
| Resin solution |  |  |  |  |  |  |  |  |
| Kind | (A-1) | (A-2) | (A-3) | (A-4) | (A-5) | (A-6) | (A-7) | (A-8) |
| Amount (part) | 123.3 | 123.3 | 123.3 | 123.3 | 123.3 | 123.3 | 123.3 | 123.3 |
| Ethylene glycol monobutyl ether | 0 | 3 | 3 | 3 | 3 | 3 | 3 | 3 |
| Acid |  |  |  |  |  |  |  |  |
| Acetic acid | 1.4 | 1.4 |  |  | 1.4 | 1.4 | 1.4 |  |
| Formic acid |  |  |  | 1.4 |  |  |  |  |
| Lactic acid |  |  | 2.2 |  |  |  |  |  |
| Catalyst |  |  |  |  |  |  |  |  |
| Kind | Cobalt acetate | Lead acetate | Calcium acetate | MH* |  | ZN* | Lead acetate | Lead acetate |
| Amount (part) | 1 | 2 | 3 | 2 |  | 3 | 3 | 2 |
| Deionized water | 507 | 483 | 481 | 483 | 485 | 482 | 482 | 484 |

|  |  | Example |  |  |  | Comparison Example |  |  |
|---|---|---|---|---|---|---|---|---|
|  |  | 22 | 23 | 24 | 25 | 26 | 5 | 6 | 7 |
| Pigment paste |  |  |  |  |  |  |  |  |  |
| Resin solution |  |  |  |  |  |  |  |  |  |
| Kind | (A-9) | (A-10) | A-11 | M-1 | M-2 | AC-1 | AC-2 | MC-1 |
| Amount (part) | 10 | 10 | 10 | 10 | 10 | 10 | 10 | 10 |
| Carbon black | 0.5 | 0.5 | 0.5 | 0.5 | 0.5 | 0.5 | 0.5 | 0.5 |
| Titanium whie (rutile) | 10 | 10 | 10 | 10 | 10 | 10 | 10 | 10 |
| Clay | 15 | 15 | 15 | 15 | 15 | 15 | 15 | 15 |
| Ethylene glycol monobutyl ether |  |  | 3 | 3 | 3 | 3 | 3 | 3 |
| Acid |  |  |  |  |  |  |  |  |
| Acetic acid | 0.7 | 0.7 | 0.7 | 0.7 | 0.7 | 0.7 | 0.7 | 0.7 |
| Deionized water | 26.8 | 26.8 | 26.8 | 26.8 | 26.8 | 26.8 | 26.8 | 26.8 |
| Aqueous clear solution |  |  |  |  |  |  |  |  |
| Resin solution |  |  |  |  |  |  |  |  |
| Kind | (A-9) | (A-10) | A-11 | M-1 | M-2 | AC-1 | AC-2 | MC-1 |
| Amount (part) | 123.3 | 123.3 | 123.3 | 123.3 | 123.3 | 123.3 | 123.3 | 123.3 |
| Ethylene glycol monobutyl ether | 3 | 3 | 3 | 3 | 3 | 3 | 3 | 3 |
| Acid |  |  |  |  |  |  |  |  |
| Acetic acid | 1.4 | 1.4 | 1.4 | 1.4 | 1.4 | 1.4 | 1.4 | 1.4 |
| Catalyst |  |  |  |  |  |  |  |  |
| Kind | Lead acetate | Lead acetate | Lead acetate | Lead acetate | Lead acetate | Lead acetate | Lead acetate | Lead acetate |
| Amount (part) | 2 | 2 | 2 | 2 | 2 | 2 | 2 | 2 |
| Deionized water | 483 | 483 | 483 | 483 | 483 | 483 | 483 | 483 |

*Note:
The symbol "MH" stands for molybdenum hydroxide.
The symbol "ZN" stands for zinc naphthenate.

TABLE 6

| Properties | Baking temperature | Example | | | | | | | |
|---|---|---|---|---|---|---|---|---|---|
|  |  | 14 | 15 | 16 | 17 | 18 | 19 | 20 | 21 |
| Gel fraction | 140° C. | 88 | 84 | 82 | 85 | 88 | 84 | 80 | 89 |
| ratio (*1) (%) | 160° C. | 96 | 92 | 97 | 95 | 93 | 95 | 92 | 97 |
| Loss on | 140° C. | 0.5 | 0.8 | 0.7 | 0.5 | 0.7 | 0.8 | 0.8 | 0.6 |
| heating (*2) (%) | 160° C. | 2.8 | 2.9 | 3.2 | 2.2 | 3.0 | 2.7 | 2.8 | 2.9 |
| Resistance to | 140° C. | 800 H | 700 H | 700 H | 800 H | 700 H | 800 H | 700 H | 800 H |
| salt spray (*3) | 160° C. | 1200 H | 1100 H | 1100 H | 1200 H | 1100 H | 1100 H | 1100 H | 1200 H |

| Properties | Baking temperature | Example | | | | | Comparison Example | | |
|---|---|---|---|---|---|---|---|---|---|
|  |  | 22 | 23 | 24 | 25 | 26 | 5 | 6 | 7 |
| Gel fraction | 140° C. | 90 | 91 | 87 | 92 | 91 | 75 | 88 | 77 |
| ratio (*1) (%) | 160° C. | 96 | 96 | 92 | 97 | 97 | 95 | 94 | 94 |
| Loss on | 140° C. | 0.5 | 0.7 | 0.5 | 1.0 | 0.9 | 2.0 | 5.0 | 4.5 |
| heating (*2) (%) | 160° C. | 2.5 | 2.9 | 2.5 | 3.3 | 3.0 | 15.0 | 12.5 | 9.0 |
| Resistance to | 140° C. | 800 H | 800 H | 700 H | 800 H | 900 H | 400 H | 500 H | 500 H |

TABLE 6-continued

| salt spray (*3) | 160° C. | 1100 H | 1200 H | 900 H | 1200 H | 1300 H | 1100 H | 700 H | 700 H |

The tests as listed in Table 6 were conducted by the same methods as above.

We claim:

1. A resin coating composition consisting essentially of a resin containing tertiary amino group and 3-alkoxyalkyl-3-acryloyl or methacryloyl-ureido group which is at least 0.6 in average number per molecule and which is represented by the formula

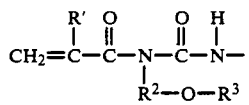  (I)

wherein $R^1$ is a hydrogen atom or a methyl group, $R^2$ is an alkylene group having 1 to 4 carbon atoms, and $R^3$ is an alkyl group having 1 to 10 carbon atoms, the resin having a number-average molecular weight of about 800 to about 50,000 and capable of becoming soluble or dispersible in water on neutralization.

2. A resin coating composition according to claim 1 wherein the resin contains the tertiary amino group in an amount of about 0.4 to about 2.1 moles per kilogram of the resin.

3. A resin coating composition according to claim 1 wherein the resin contains about 1 to about 60 ureido groups of the formula (I) on the average per molecule.

4. A resin coating composition according to claim 1 wherein the resin optionally contains primary or secondary hydroxyl group and has the primary or secondary hydroxyl group and the ureido group of the formula (I) incorporated in a combined number of at least two on the average per molecule.

5. A resin coating composition consisting essentially of a mixture of a resin containing at least 1.4 primary or secondary hydroxyl groups on the average per molecule, the resin having a number-average molecular weight of about 600 to about 50,000 and a resin containing at least one 3-alkoxyalkyl-3-acryloyl or methacryloylureido group on the average per molecule which is represented by the formula

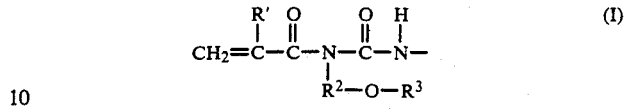  (I)

wherein $R^1$ is a hydrogen atom or a methyl group, $R^2$ is an alkylene group having 1 to 4 carbon atoms, and $R^3$ is an alkyl group having 1 to 10 carbon atoms, the resin having a number-average molecular weight of about 400 to about 30,000, at least one of the resins in the mixture containing tertiary amino group sufficient to make the mixture soluble or dispersible in water on neutralization.

6. A resin coating composition according to claim 5 wherein the hydroxyl-containing resin contains about 1.4 to about 430 primary or secondary hydroxyl groups on the average per molecule.

7. A resin coating composition according to claim 5 wherein the resin contains about 2 to about 40 ureido groups of the formula (I) on the average per molecule.

8. A resin coating composition according to claim 5 wherein the hydroxyl-containing resin optionally contains the ureido group of the formula (I), and has the primary or secondary hydroxyl group and the ureido group of the formula (I) in a combined amount of at least two on the average per molecule.

9. A resin coating composition according to claim 5 wherein the mixing weight ratio of the hydroxyl-containing resin to the resin containing the ureido group of the formula (I) is between about 95 : 5 and about 30 : 70 in terms of solid content.

10. A resin coating composition according to claim 5 wherein the tertiary amino group is present in an amount of about 0.4 to about 2.1 moles per kilogram of the mixture of the hydroxyl-containing resin and the resin containing the ureido group of the formula (I) in terms of solid content.

11. A cationic electrophoretic coating method comprising the steps of making at least one of the resin coating compositions as defined in claim 1 into an aqueous form by neutralization and electrophoretically applying the aqueous composition to a substrate serving as a cathode.

12. A cationic electrophoretic coating method comprising the steps of making at least one of the resin coating compositions as defined in claim 5 into an aqueous form by neutralization and electrophoretically applying the aqueous composition to a substrate serving as a cathode.

* * * * *